United States Patent
Liu et al.

(10) Patent No.: US 10,836,470 B2
(45) Date of Patent: Nov. 17, 2020

(54) LOPSIDED PAYLOAD CARRIAGE GIMBAL FOR AIR AND WATER-BORNE VEHICLES

(71) Applicants: Anshuo Liu, Montclair, CA (US); Minh Chau, Los Angeles, CA (US)

(72) Inventors: Anshuo Liu, Montclair, CA (US); Minh Chau, Los Angeles, CA (US)

( * ) Notice: Subject to any disclaimer, the term of this patent is extended or adjusted under 35 U.S.C. 154(b) by 83 days.

(21) Appl. No.: 16/350,395

(22) Filed: Mar. 27, 2018

(65) Prior Publication Data

US 2020/0011758 A1   Jan. 9, 2020

Related U.S. Application Data

(60) Provisional application No. 62/477,202, filed on Mar. 27, 2017.

(51) Int. Cl.

| | |
|---|---|
| *B64C 17/02* | (2006.01) |
| *B63B 39/02* | (2006.01) |
| *B64F 5/50* | (2017.01) |
| *G01M 1/12* | (2006.01) |
| *B64D 9/00* | (2006.01) |
| *B64C 39/02* | (2006.01) |

(52) U.S. Cl.
CPC .............. *B64C 17/02* (2013.01); *B63B 39/02* (2013.01); *B64F 5/50* (2017.01); *G01M 1/125* (2013.01); *B64C 39/024* (2013.01); *B64C 2201/128* (2013.01); *B64D 9/00* (2013.01)

(58) Field of Classification Search
CPC . B64C 17/02; B64C 39/024; B64C 2201/128; B64F 5/50; B63B 39/02; G01M 1/125; B64D 9/00
See application file for complete search history.

(56) References Cited

U.S. PATENT DOCUMENTS

| | | | | |
|---|---|---|---|---|
| 2,156,862 | A * | 5/1939 | Best ...................... | F16M 11/08 248/123.2 |
| 8,540,438 | B1 * | 9/2013 | Cronin .................. | B66F 11/048 396/428 |
| 8,576,044 | B2 * | 11/2013 | Chapman ............. | H01H 23/143 338/68 |
| 10,139,042 | B2 * | 11/2018 | Hashiguchi ............ | F16M 11/24 |
| 2002/0001471 | A1 * | 1/2002 | Chapman ............... | F16M 11/38 396/428 |
| 2014/0263834 | A1 * | 9/2014 | Goodman ................ | B64D 9/00 244/118.1 |

* cited by examiner

*Primary Examiner* — Justin M Benedik

(57) ABSTRACT

The Lopsided Payload Carriage Gimbal in al its embodiments allow Aerial Vehicles and Water-borne vehicles to carry payloads far from the vehicle Geometric Center without significant travel of the vehicle's overall Center of Gravity. Large travel of the CG limits vehicle's performance or renders it inoperable. The embodiments rely on the interaction of the payload and the counter balancing weight through the payload link 18, balancing link 10 main link 14 and battery pylon 8 to substantially reduce the torque generated by the payload in a lopsided position. The embodiments also allow the vehicle carrying the payload to change thrust direction agilely. Finally, the embodiment acts as a mechanical stabilization device for the payload as well. This invention is adaptable to all forms of hover-capable aerial vehicles as well as water-borne vehicles.

7 Claims, 10 Drawing Sheets

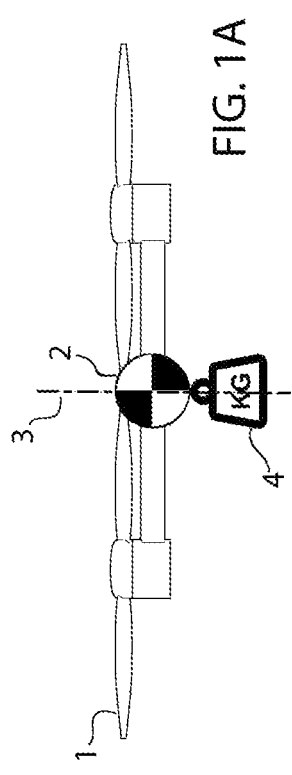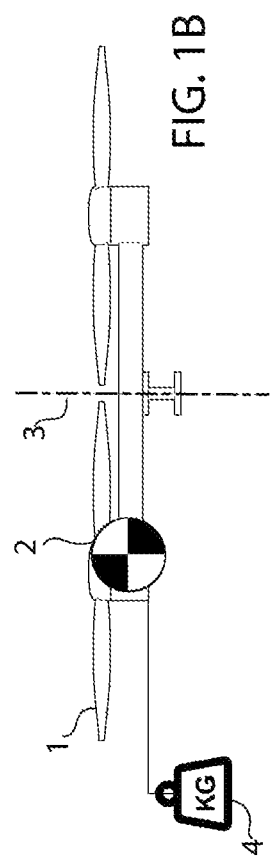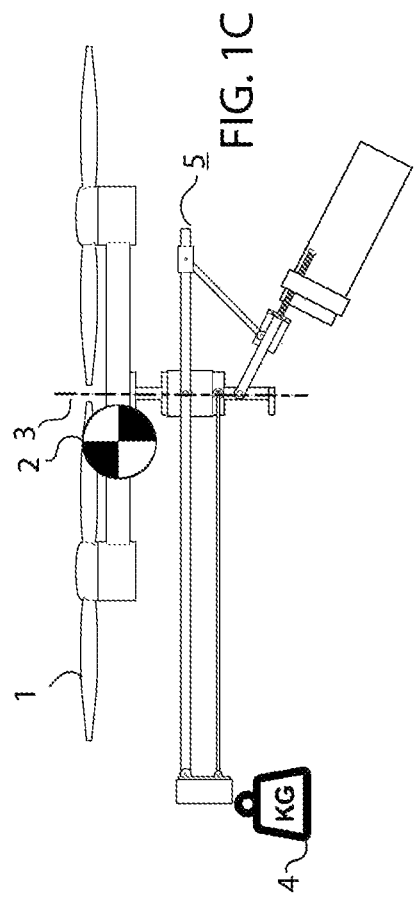

LOPSIDED PAYLOAD CARRIAGE GIMBAL FOR AIR AND WATER-BORNE VEHICLES

CROSS-REFERENCE TO RELATED APPLICATIONS

This application references provisional application No. 62/477,202, filed on Mar. 27, 2017 In the USA by the present inventor.

SUMMARY OF THE INVENTION

In accordance with the embodiments, the payload carriage gimbal system allows aerial vehicles to carry substantial payloads in a lopsided position without causing substantial changes to the position of vehicle CG.

BACKGROUND

The following is a tabulation of some prior art that presently appears relevant:

US Patents

| U.S. Pat. No. | Kind Code | Issue Date | Patentee |
| --- | --- | --- | --- |
| US 2016/0041628 | A1 | Feb. 11, 2016 | Verma |
| US 2017/0036771 | A1 | Feb. 9, 2017 | Woodman |
| US 2015/0377405 | A1 | Dec. 31, 2015 | Down |
| US 2016/0291445 | A1 | Oct. 6, 2016 | Fisher Sr |
| US 2016/0159472 | A1 | Jun. 6, 2016 | Chan |
| US 2014/0270743 | A1 | Sep. 18, 2014 | Webb |
| US 2017/0227162 | A1 | Aug. 10, 2017 | Saika |

Foreign Patent Documents

| Foreign Doc Number | Cntry Code | Kind Code | Pub Dt | App or Patentee |
| --- | --- | --- | --- | --- |
| RU127862U1 | RU | NA | 2012 Dec. 12 | Василий Эдуардович Сырников |

Aerial Vehicles (AV) of the multi-rotor type are finding applications in many hobby, commercial and otherwise professional uses today due to their small size, ability to takeoff vertically, and hover. They are used in the fields of geological survey, search and rescue, as well as media production. There are various types of payloads carried by the AV, mostly optical sensors.

Earlier designs of the multi rotor AVs comprise of payload attachment points near the AV's Center of Gravity (CG). A miniaturized version of US patent 2014/0270743 is a good example of a common payload attachment device. The payload mounting position and device are sufficient for gathering data from a top down view. However, to clear the optical sensor's forward Field of View (FOV), the sensor mounting position had to be moved away from the Geometric Center (GC) of the AV, resulting in the movement of AV CG.

Looking at a conventional quad-copter AV frame 1 in FIG. 1A, the Center of Gravity (CG) 2 and Geometric Center (GC) 3 are very close together. When loads 4 are attached away from the Geometric Center in FIG. 1B, the CG 2 shifts toward the attached weight, which resulted in a net torque on the vehicle. Motors closest to the CG of the aerial vehicle must generate more thrust to cancel the net torque and keep the AV horizontal in order to maintain hover and controlled flight. However, putting more load on some of the motors results in lower efficiency and thus more power consumption. In a Single Rotor (SR) or Coaxial Counterrotating Dual Rotor (CCDR) type AV, aerodynamic control surfaces must be constantly deployed, significantly lowering propulsive efficiency.

Regardless of AV design, the maximum compensating torque is limited by vehicle geometry and maximum thrust. If CG shift is severe, the AV may be rendered inoperable.

Creative vehicle designs allowed some vehicles to provide the optical sensors a clean FOV. These aerial vehicles are designed with slender bodies that allowed the positions of hardware components to counter balance the lopsided positioning of the sensors, resulting in no movement of the Center of Gravity. US patent US 2016/0291445 and US patent US 2017/0036771 awarded to Fisher and Woodman are some of the examples for such developments. Typical payload attachment devices such as the one disclosed in US patent 2017/0227162 are used. However, locating mass further away from vehicle GC results in an increase in moment of inertia, which reduces vehicle's agility. As a result, the aerial vehicles cannot change direction rapidly.

If the payload is to become heavier, or the position is to be placed further away from the CG, the aerial vehicles will have to be redesigned: either the fuselage of the aerial vehicles will have to be extended to increase the length of the balancing lever arm, or the balancing weight needs to become heavier.

Compounding the problem further are payloads that could vary in weight or position during flight. For example, US patent 2015/0377405 by Down proposed a system where the payload is a miniature robot used to inspect tight spaces. In this patent, a parent vehicle releases the child vehicle when tight spaces are reached, changing the CG of the parent drone system. Because of the light weight nature of the child vehicle in this patent, the vehicle maintains balance by modulating propeller speed in a traditional fashion.

To deal with heavier lopsided loads, the morphing aerial vehicles design disclosed in US Patent 2016/0159472A1 by Chan attempts to adjust the placement of thrust motor in the most efficient position to achieve max hovering efficiency. However, this patent calls for high mechanical complexity and a minimum of three motors to work. Coaxial aerial vehicles designs will not be able to benefit from Chan's work.

Efficiently carrying lopsided and unbalanced load could realize many new applications of aerial vehicles, beyond simply improving optical sensor FOV. Carrying payload beyond the diameter of the propeller allows aerial vehicles to interact with vertical surfaces, human beings and other mechanical devices directly to the side of an aerial vehicle, without dangerous interference from the fast-spinning propeller blades.

Water-borne vehicles also face this type of CG movement problem that may cause capsizing when a heavy load is added in a lateral position using a crane from starboard or portside. Water-borne vehicles rely on the buoyancy of water around the hull to maintain the vehicle's upright position in water. The only means to change CG is through internal rearrangement of cargo or fuel. On a small vessel without the room to rearrange cargo or fuel, travel in CG when taking on a lateral load is inevitable.

Advantage

Accordingly, several advantages of are as follows: to provide airborne and waterborne vehicles a mean to carry non-trivial payload weight in a lopsided position, that can carry non-trivial payload weight in a position beyond vehicle footprint, that can restrict CG travel to a marginal amount, that can compensate for variation in payload weight, that can be applied to coaxial, multi-copter and waterborne vehicles alike, that is mechanically relatively simple, that maintains agility of the vehicle. These and other benefits will become apparent from a consideration of the ensuing description accompanying drawing.

DESCRIPTION OF DRAWINGS

FIG. 1 A-C show and compare the behavior of the CG of a conventional aerial vehicle and of an aerial vehicle equipped with one of the embodiments. FIG. 1A shows the relationship of an aerial vehicle's Center of Gravity and Geometric Center when the payload is positioned near the Geometric Center; FIG. 1B shows the relationship of an aerial vehicle's Center of Gravity and Geometric Center when the payload is positioned away from the Geometric Center; FIG. 1C shows the reduced CG travel when the aerial vehicle uses one of the embodiment to carry Identical payload in identical position as shown in FIG. 1B.

FIG. 7 A-B show how the vehicle can quickly change angle of thrust despite higher moment of inertia.

FIG. 8 A-B show the range of motion of the gimbal in pitch up and pitch down posture.

FIG. 9 A-D show various embodiments in side view, of inverted and conventional configuration, installed on quad-copter and coaxial copter vehicles.

DETAILED DESCRIPTION

First Embodiment

Fig. 2-Fig. 8

Figure 2:
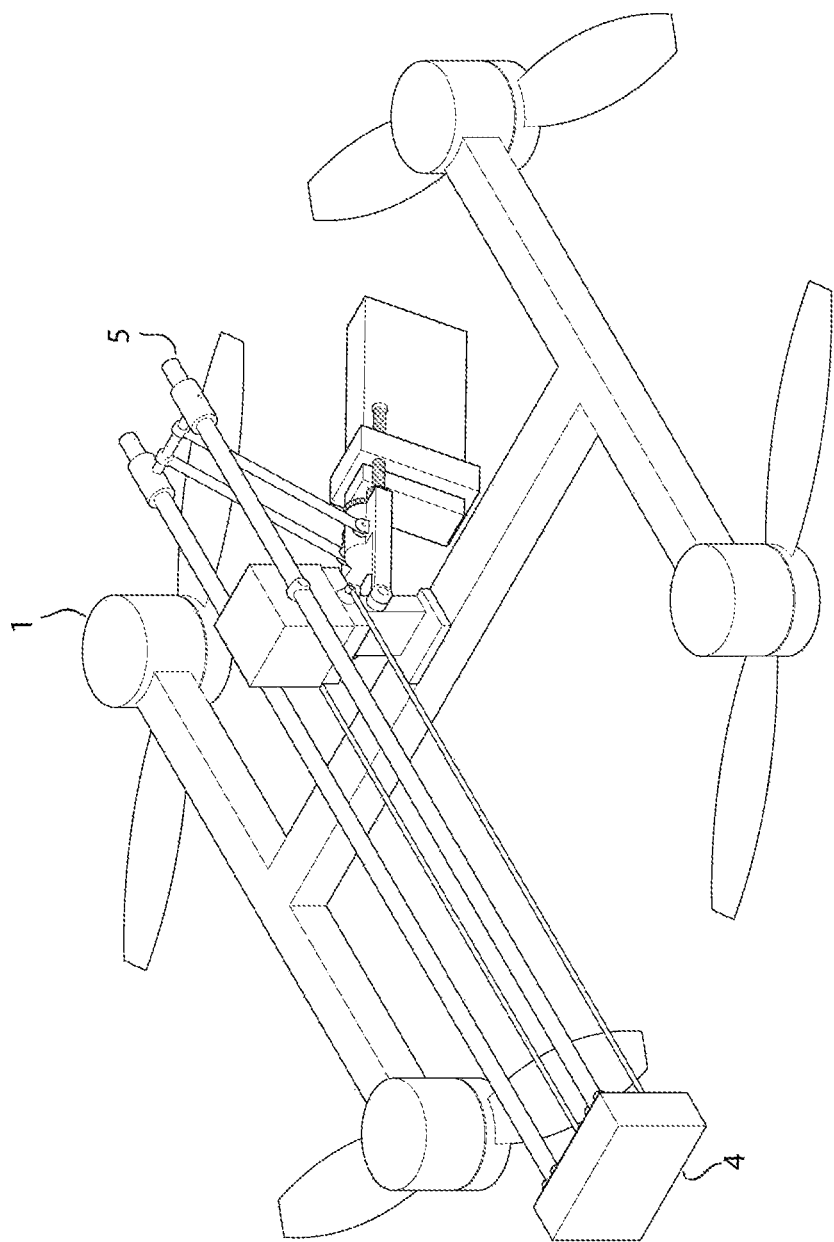
FIG. 2 shows the front isometric view of an embodiment comprising a conventional gimbal configuration installed on a quad-copter aerial vehicle.
Figure 3:
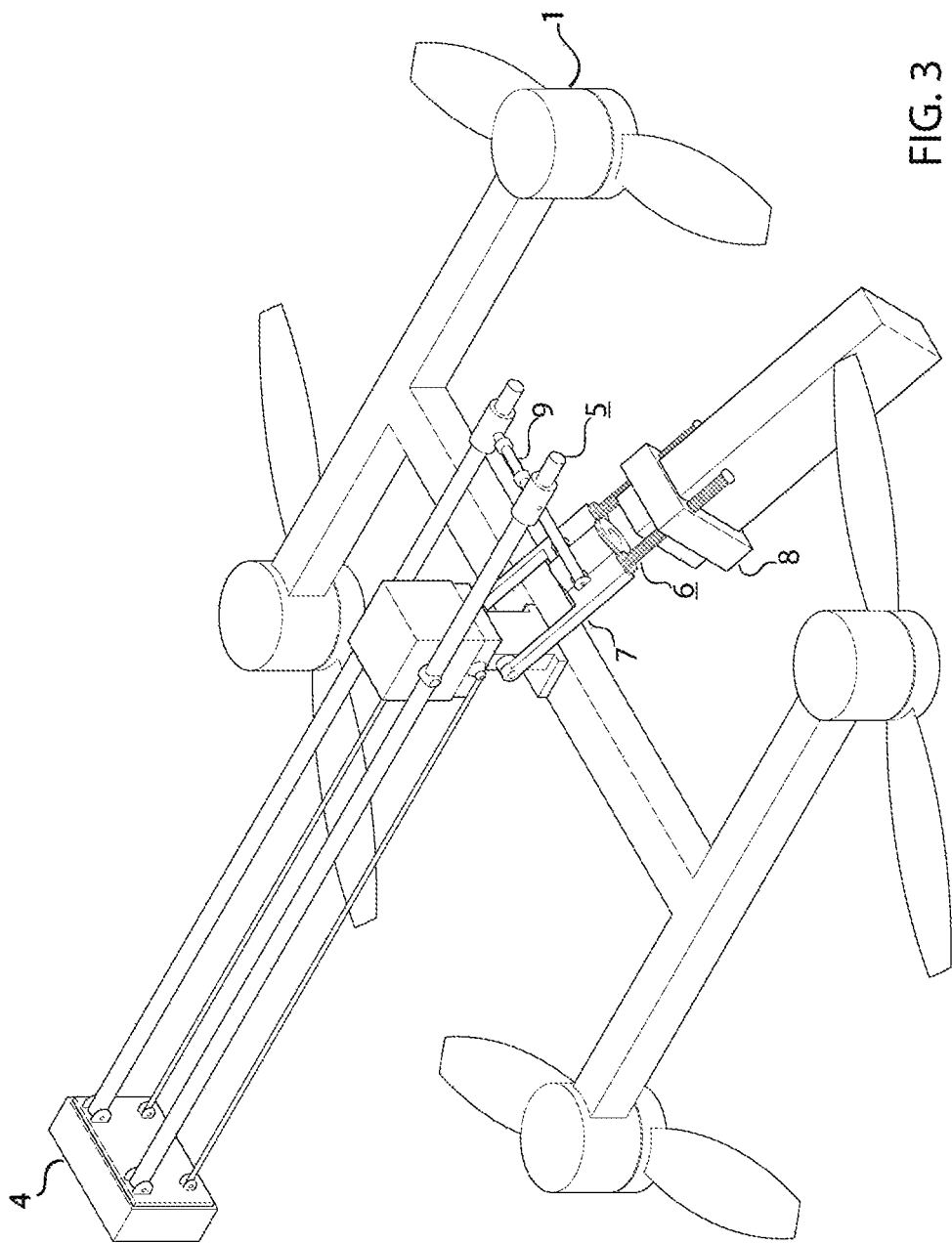
FIG. 3 shows back isometric view of an embodiment comprising a conventional gimbal configuration installed on a quad-copter aerial vehicle.

FIG. 2 and FIG. 3 show an isometric view of a conventional version of the gimbal 5, installed on a generic quad-copter aerial vehicle with "H" frame 1. The gimbal comprises of multiple linkages. FIG. 2 depicts the gimbal system facing the front, with a payload mount 20 in clear view, holding a dummy payload. FIG. 3 shows the gimbal system facing the back, with a battery 11, battery pylon 8, battery position adjustment system 6 and a balancing pivot 9 clearly visible. This embodiment uses flight battery 11 as the counter balancing weight. The embodiment of FIG. 2 and FIG. 3 have a double beam design, where every linkage in the gimbal has a second redundancy, providing rigidity against torsion that could be experienced under heavy payload. The double beam design could be replaced with single beam design in other embodiments. The payload mount 20 is positioned beyond the tip of the aerial vehicle's propellers.

Figure 4:
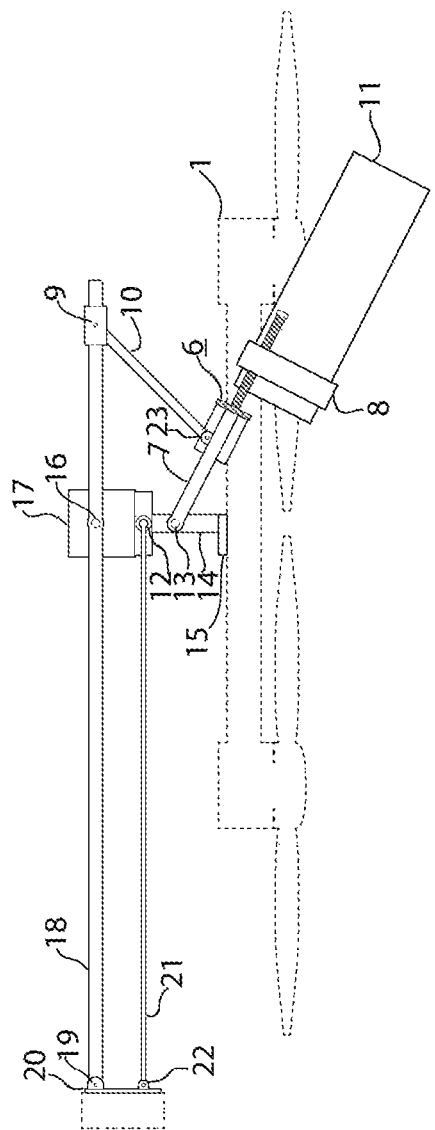
FIG. 4 shows the side view of the gimbal embodiment in conventional configuration.

FIG. 4 shows the gimbal system 5 from the side, clearly identifying the linkages that form a closed-chain loop pivotally connected at four pivots. The four pivots 9, 16, 13 and 23 allow links to move in parallel planes. In FIG. 4, the vehicle payload is installed on the payload mount 20 attached to one end of the payload link 18. The second end of the payload link 18 is pivotally connected to a balancing link 10 through the balancing pivot 9. Main pivot 16 is positioned between the payload mount 20 and balancing pivot 9. The payload link 18 is pivotally connected to a drive servo 17 and main link 14 through main pivot 16. The drive servo 17 is of a rotation servo type, anchored to the main link 14 and with the servo blade fixed to the payload link 18. The pitch drive servo 17 axis of rotation is identical to axis of the main pivot 16. The main link 14 also contains the power pivot 13, which pivotally connects a battery link 7. The power pivot 13 is designed to act as a bearing and slip ring capable of handling high current flow as well as allowing the battery link 7 and the main link 14 to pivot against each other under the load of battery balancing force 21. The battery link 7 connects a battery position adjustment system 6 and a battery pylon 8 to the power pivot 13. The battery link 7 is pivotally connected to the balancing link 10 through the counter weight pivot 23. The counter weight pivot 23 is situated between power pivot 13 and battery pylon 8. The gimbal 5 attaches to the vehicle's airframe at the vehicle attachment point 15, situated at one end of the main link 14.

Figure 5:
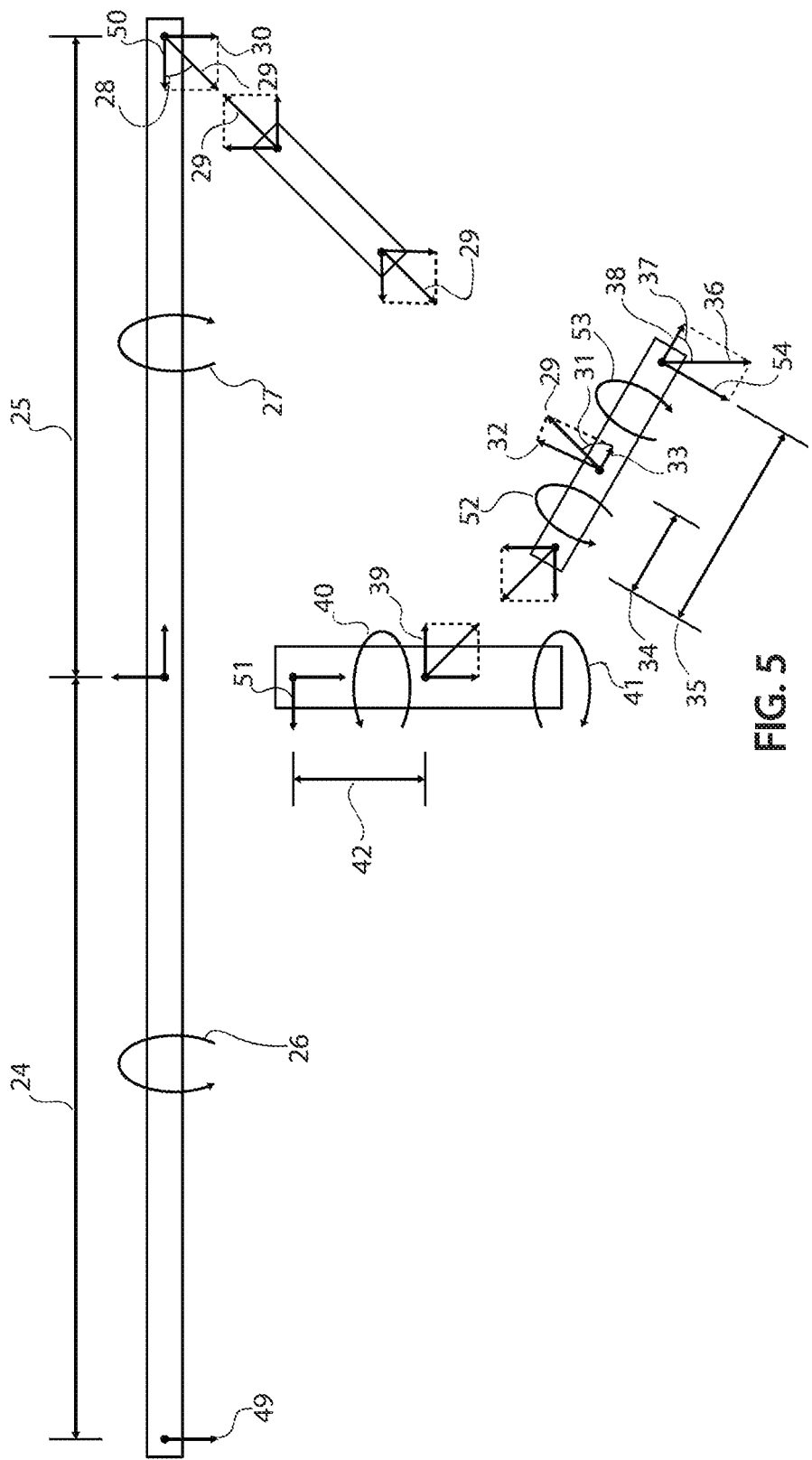
FIG. 5 shows the free body diagram of the gimbal in conventional configuration.

Shown in FIG. 5, the main pivot 16 acts as a fulcrum, dividing the payload link 18 into two torque arms, identified as payload torque arm 24 and balancing torque arm 25. FIG. 5 also shows the effective length of the drive servo and the main link 42, which is from the main pivot 16 to the power pivot 13.

FIG. 4 embodiment also contains additional support features to add additional functionality. Parallel bar 21, payload pivot 19 and 22, and main link parallel pivot 12 can be added to keep the payload oriented in a nominal angle, despite any changes in payload link 18 pitch angle. The parallel bar 21 is equal in length to the payload torque arm 24. The parallel bar 21 is pivoted at both ends by payload mount parallel pivot 22 and by main link parallel pivot 12. The payload pivots 19 and 20 are vertically aligned; the main pivot 16 and main link parallel pivot are vertically aligned. The vertical distance between both sets of pivots are identical.

Another support feature shown in FIG. 4 is the pitch drive servo 17 that is used to drive payload link 18 pitch angle to a certain position. The pitch drive servo 17 is of a rotation servo type, anchored to the main link 14 and with the servo blade attached to the payload link 18. The pitch drive servo 17 axis of rotation is identical to axis of the main pivot 16.

Figure 6:
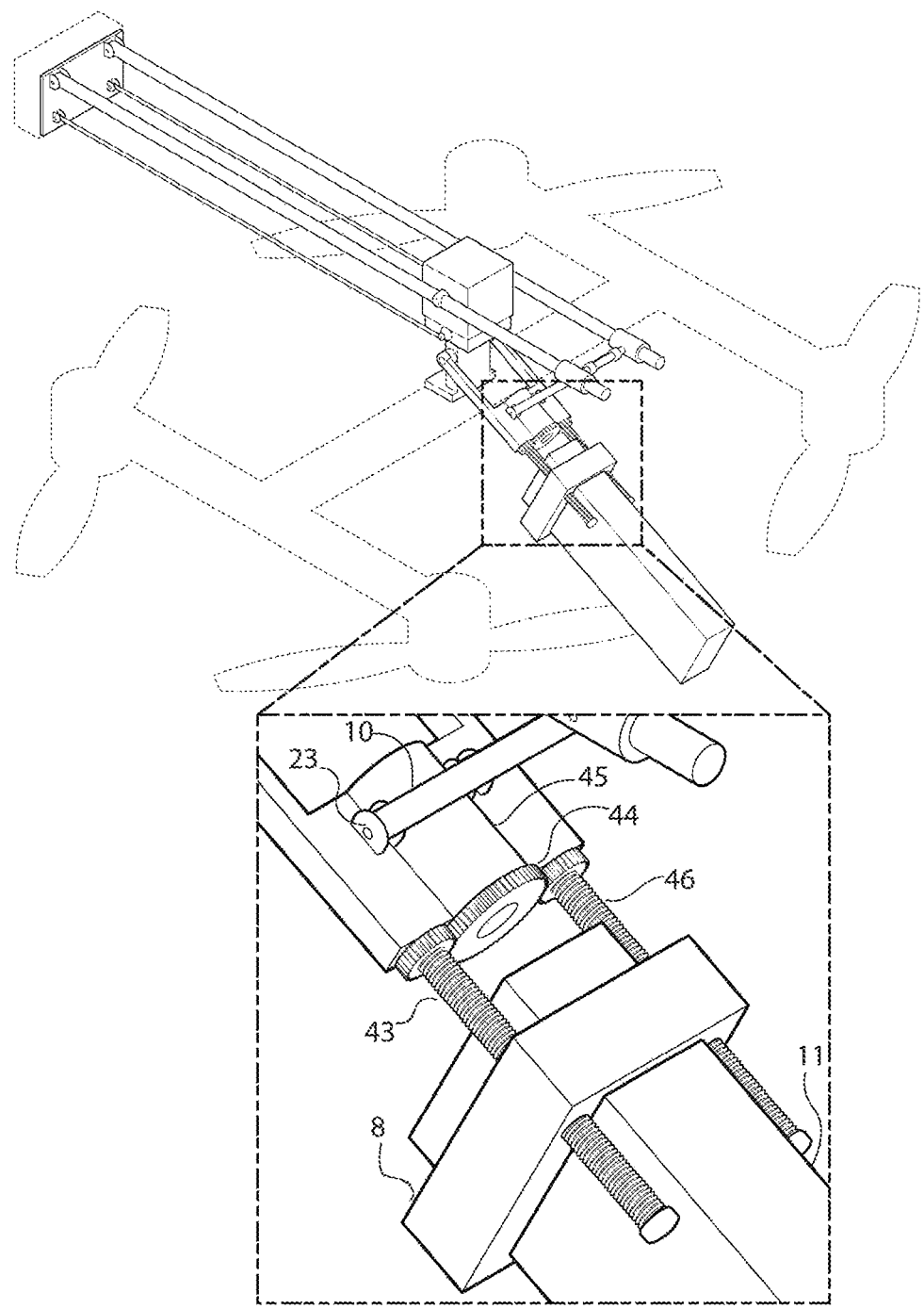
FIG. 6 shows the details of one embodiments of the battery position adjustment system.

FIG. 6 is a detailed view showing one embodiment of worm-screw-driven battery position adjustment system 6. It automatically adjusts gimbal counter torque to react to variation in payload weight. As shown in this embodiment, the battery position adjustment system 6 comprising of a screw shafts 43, a drive gear 44, a drive motor 45, a guide shaft 46 and a battery pylon with interior thread 8. A electronics controller may command the drive motor 45 to drive the gear 44 and screw shaft 43, which moves the battery position linearly towards or away from the counter weight pivot 23. While rotating, the screw shaft 43 transfers linear forces to the battery pylon 8 through the threads. Rotation of the screw shaft 43 would also transfer rotational force to the pylon 8. The guide shaft 46 is designed to dissipate the rotational force. The guide shaft 46 design as shown in this embodiment can be simplified to a smooth guide without the threads.

Operations

FIG. 5 shows the free body diagram of the gimbal system linkages, used in demonstrating how the gimbal 5 balances lopsided loads and limiting CG travel of the aerial vehicle.

When the gimbal 6 is in static state, the payload torque 26 is equal to the balancing torque 27. The payload torque 26 is defined as the payload torque arm 24 multiplied by payload weight 49. The balancing torque 27 is calculated by multiplying the balancing torque arm 25 with the product of sine of balancing force angle 28 and battery balancing force 29. Trigonometric operator sine is used because the balancing force component perpendicular to the payload link 30 generates the balancing torque 27. The balancing force component parallel to the payload link 50 is calculated by multiplying the balancing torque arm 25 with the product of cosine of balancing force angle 28 and battery balancing force 29. This parallel force component is transferred to the main link 14 as the payload link to main link shear reaction force 51.

The battery balancing force 29 is a reactive force that retains the battery in a static position. In a static position, battery balancing torque 52 is equal to battery weight torque 53. The battery balancing force component perpendicular to the battery link 32 and the battery balancing force torque arm 34 generate battery balancing torque 52. The battery weight component perpendicular to the battery link 54 and the battery weight torque arm 35 generate battery weight torque 53. The perpendicular force components 32 and 54 are calculated using sine of battery force angle 31 and sine of battery pitch angle 37 respectively.

The gimbal system as shown in this embodiment can balance a heavier payload using a lighter counter weight and shorter balancing torque arm 25 because the relationship between battery balancing force torque arm 34 and battery weight torque arm 35. By placing the counter weight pivot 23 as close to the power pivot 13 as possible, the battery balancing force torque arm 34 becomes shorter. The battery weight torque arm 35 is measured from the power pivot and the Center of Gravity of the battery. In order to maintain static positions, the battery balancing force 29 has to be increased to compensate for the shorter battery balancing force torque arm 34. The battery position adjustment system 6 is used to extend or shorten the battery weight torque arm 35. Extending the battery weight torque arm 35 further increases battery balancing force 29.

Battery balancing force component parallel to the battery link 33 is calculated by multiplying cosine of battery force angle 31 and battery balancing force 29. Battery weight component parallel to the battery link 38 is calculated by multiplying cosine of battery angle from vertical 37 and battery balancing weight 35. Both force components 33 and 38 are transferred to the main link 14 as the battery link to main link shear reaction force 39.

Payload link to main link shear reaction force 51 and battery link to main link shear reaction force 39 generate a lopsided torque 40 that is transferred to the aerial vehicle 1 through the vehicle attachment point 15. The lopsided torque is felt by the aerial vehicle 1 as the sum of the two shear forces 39 and 51 applied at a distance equivalent to the effective main link distance 42 in front of the attachment point. The effective main link distance 42 is the maximum distance in the movement of the aerial vehicle's CG 2. By shortening the effective main link distance 42 to a minimum possible through mechanical design, the shift in CG can be reduced further. The effect of the gimbal 5 on a multi-copter aerial vehicle is shown in FIG. 1C. In order to control vehicle attitude, the aerial vehicle 1 generates a counter torque 41 to cancel out the lopsided torque 40.

Figure 7A:
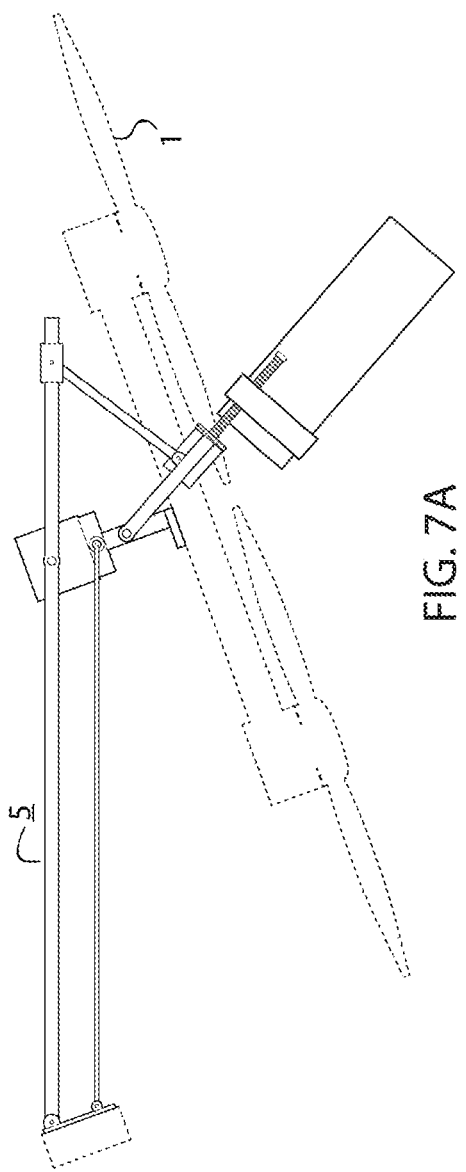
FIG. 7A shows one position of the gimbal system when the aerial vehicle quickly pitches down.
Figure 7B:
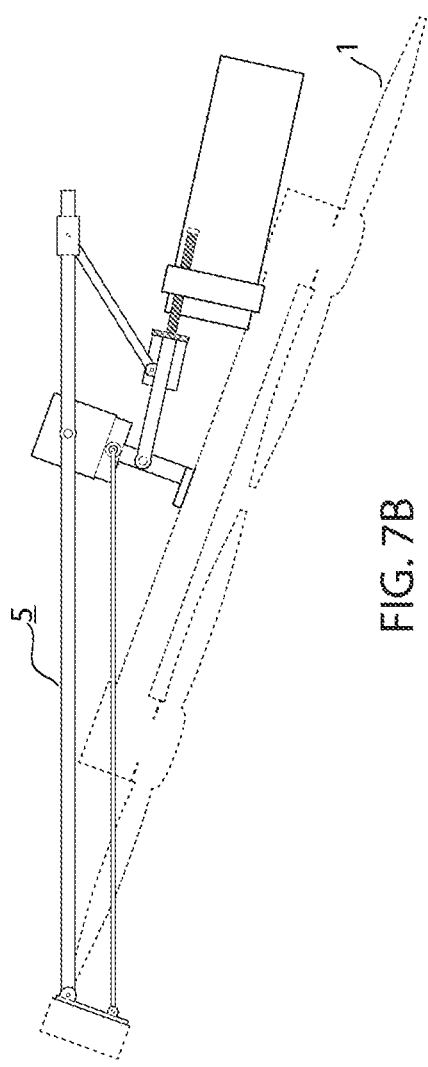
FIG. 7B shows one position of the gimbal system when the aerial vehicle quickly pitches up.

When maneuvering in flight, a generic multi-rotor type aerial vehicle changes the vehicle pitch or roll in order to vector the thrust in a different direction. A maneuver in changing the vehicle pitch is shown in FIGS. 7A and B. When the payload is attached far from the vehicle's Geometric Center 3, the moment of inertia increases. Moment of inertia resist the pitch maneuver, increasing the time it takes to complete the maneuver. FIGS. 7A and B show that with the embodiment of the gimbal, the angle of the payload link 18 relative to the quadcopter frame 1 is allowed to change. The gimbal 5 effectively decouples the pitch of the payload link 18 from the motors and propellers of the vehicle, allowing the vehicle to maneuver quickly. After the maneuver, the changes in the angles between the gimbal links generates a net return force that automatically returns the payload link 18 to the nominal or neutral angle relative to the quadcopter frame 1.

The ability to automatically return to nominal position could also provide mechanical stabilization to the payload.

Figure 8A:
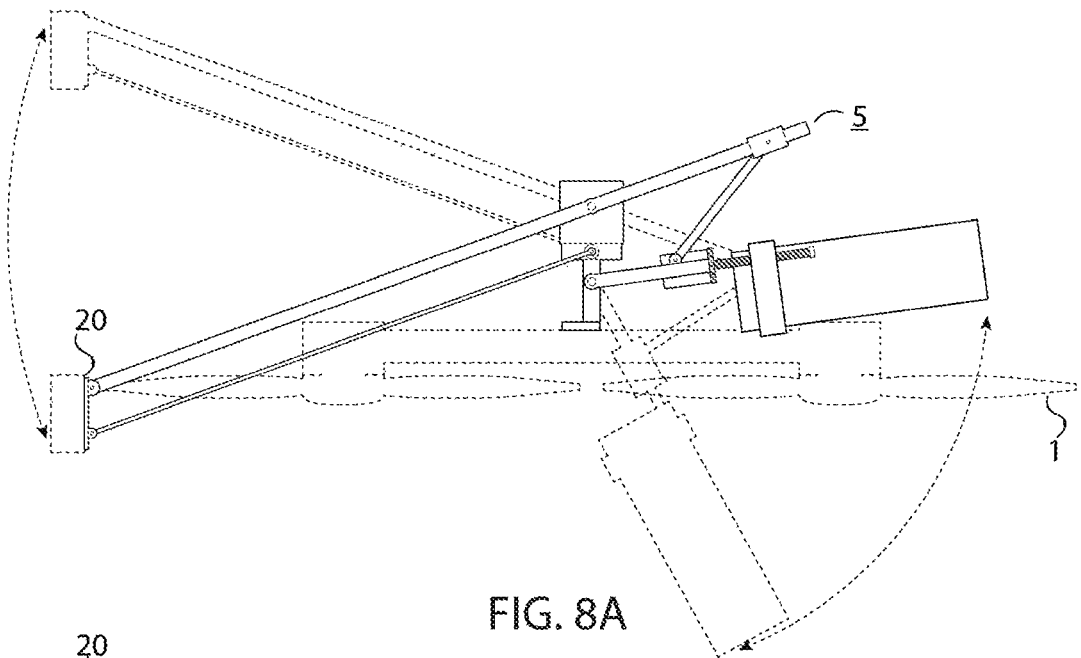
FIG. 8A, shows the gimbal in a pitched down posture while the aerial vehicle remained level.
Figure 8B:
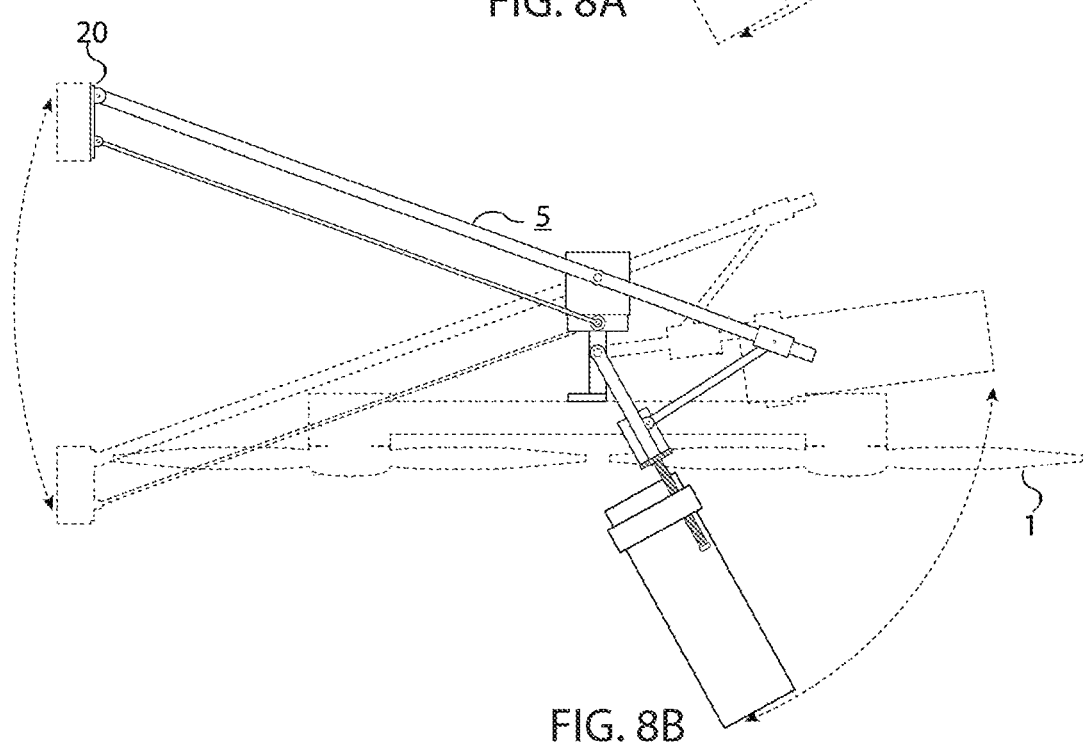
FIG. 8B shows the gimbal in a pitched up posture while the aerial vehicle remained level.

As shown in FIG. 8A, when the payload link 18 is pitched down, the battery pivots upwards about power pivot 13, lowering battery force angle 31; when the payload link 18 is pitched up as shown in FIG. 8B, the battery pivots downwards about power pivot 13, increasing battery force angle 31. When the battery force angle 31 is small, the battery balancing force 29 is increased in order to generate enough vertical force component 32 to the retain equilibrium of battery link 7 position. Vice versa, when the battery force angle 31 becomes large, the battery balancing force 29 is decreased. Because of the change in the battery force angle 31 and the resulting change in battery balancing force 29, the payload link 18 will always seek to return to the preset neutral position. Payload mount 20 as shown in FIGS. 8A and B maintains the orientation of the payload despite the changes in payload link 18 pitch angle.

With the aerial vehicle remaining in hover, the payload link 18 could be forced into a pitch up or pitch down angle. Pitch drive servo 17 is used to drive payload link 18 pitch angle to a certain position, working against the battery balancing force 29 that seeks to return the payload link 18 to the preset neutral position.

During the tuning and system setup of the gimbal, adjustment can be made to the position of the balancing pivot 9 along the payload link 18. This adjustment changes the length ratio of the payload torque arm 24 to the balancing torque arm 25. A longer balancing torque arm 25 could help the gimbal carry heavier payload mounted to the payload mount 20. At the same time, adjusting balancing pivot 9 position also changes the payload link 18 range of motion. Placing balancing pivot 9 as far away as possible from the main pivot 16 reduces range of pitching motion. Extending the length of the balancing link 10 increases the range of pitching motion. However, the pitch range is ultimately restricted by the range of motion of the counter balancing weight, which is the battery 11 in this embodiment.

Using battery as the counter weight requires the transfer of electrical power from the battery to the vehicle's electric motor control electronics. The electrical current of this electrical flow is high and thus requires the use of low gauge wires. Low gauge wires are rigid due to it's larger cross section diameters. Rigid wire severely degrades the flexibility of the gimbal system, transferring additional torque to the vehicle frame 1. As a result, the lopsided torque 40 is increased, exacerbating the travel of Center of Gravity. Therefore, the power pivot 13 is designed to transfer high current flow while functioning as a bearing.

Alternative Embodiments

Alternative embodiments can be created by changing the effective lengths of the linkages and changing the location of the pivots. Changing the effective length modifies the torque arm created by counter weights.

Alternative Embodiments

The counter weights could be any heavy flight equipment besides the battery 11.

Alternative Embodiments

Figure 9A:
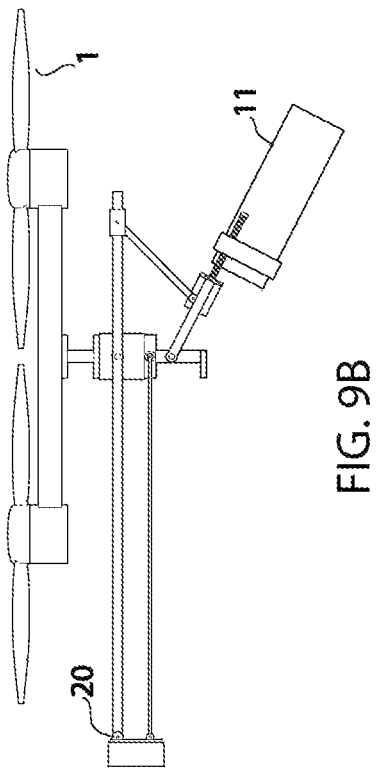
FIG. 9A shows one embodiment in conventional configuration, installed on a quad-copter aerial vehicle.
Figure 9B:
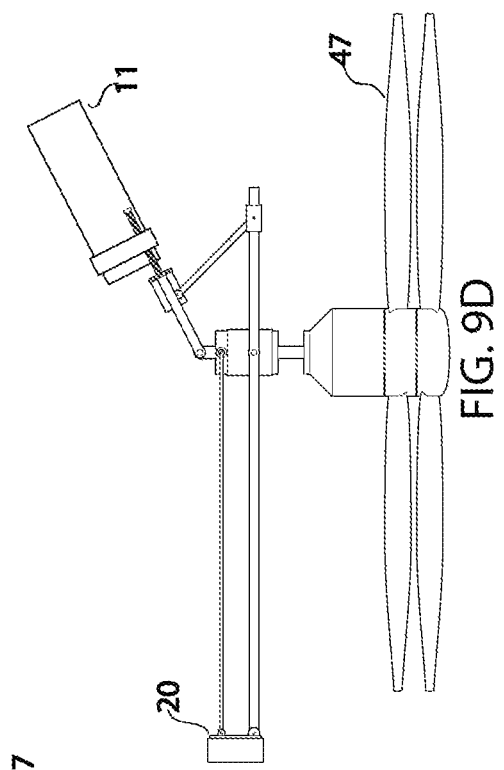
FIG. 9B shows one embodiment in inverted configuration, installed on a quad-copter aerial vehicle.

The aerial vehicle attachment point could be above the gimbal system, resulting in the inverted configuration shown in FIG. 9B.

Alternative Embodiments

The payload mount 20 could be modified to carry variable weight payloads or change payload during flight. The battery position adjustment system 6 could be used to change the battery balancing force 29, automatically restoring the payload link 18 to the nominal or neutral angle during flight without changing setup and configuration.

Alternative Embodiments

Figure 9C:
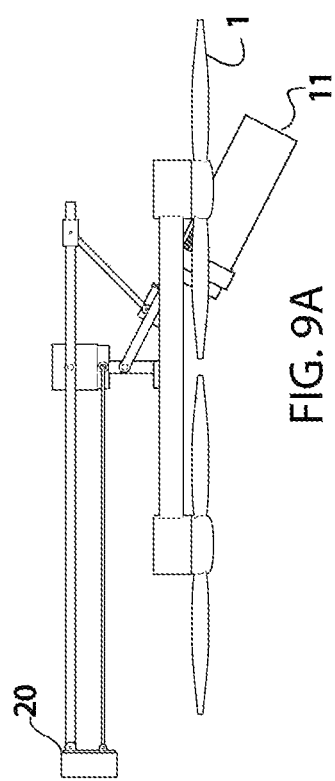
FIG. 9C shows one embodiment in inverted configuration, installed on a coaxial copter aerial vehicle.
Figure 9D:
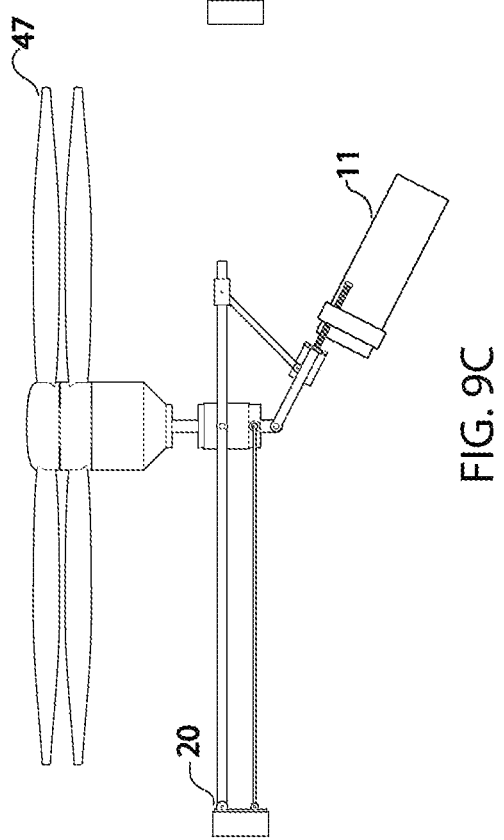
FIG. 9D shows one embodiment in conventional configuration, installed on a coaxial copter aerial vehicle.

The gimbal system can be installed on the aerial vehicle in an inverted or conventional configuration on multi-copter or Single Rotor (SR)/Coaxial Counterrotating Dual Rotor (CCDR) type vehicle frames as shown in FIG. 9C and FIG. 9D.

The gimbal must be placed in a position where the range of motion of both the battery and the payload link 18 are not restricted by any part of the vehicle frame 1. The gimbal could be place above or below the motors and propellers. The selection of configuration is purely based on the space that is available for the gimbal system and the inherent stability that's required by the vehicle system. If mounted in conventional configuration below a SR or CCDR copter as shown in FIG. 9C, an aerodynamic cowling may be necessary to shield the gimbal system from high speed airflow.

Alternative Embodiments

Using material and payload link 18 geometry that provides sufficient bending and torsional rigidity, the payload link 18 of a single rail design can be used instead of double rail design.

Alternative Embodiments

Figure 10:
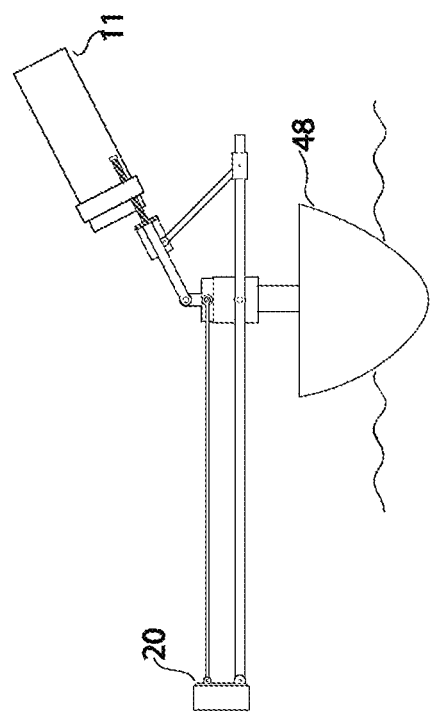
FIG. 10 shows embodiment as fitted on a waterborne vehicle looking from the front or rear.

An embodiment of the gimbal could be used on a water borne vehicle such as that shown in FIG. 10.

Advantages

From the description above, a number of high level functional advantages of some embodiments of my gimbal system become evident:

1. The gimbal provides aerial vehicles a way to carry substantial payload weight in a position, including positions beyond the tip of the propellers.
2. By reducing the mechanical advantage of the balancing weight 11, the gimbal system allows a lighter balancing weight 11 to balance a lopsided payload 4 that is generating a larger torque arm than otherwise possible.
3. The various embodiments can be applied to coaxial aerial vehicle, multi-copter aerial vehicle and waterborne vehicle alike.
4. Decoupling of the payloads from the drone frame preserves the agility and maneuverability of the aerial vehicle.
5. When the gimbal system is perturbed, changes in the angle between the members 18, 10, 7 and 14 of the gimbal system modulates the return force applied on the lopsided payload, automatically returning the gimbal to it's nominal position without additional need for actuation.

CONCLUSIONS, RAMIFICATIONS AND SCOPE

Accordingly, the reader will see that the gimbal system of various embodiments can be used to help aerial and water borne vehicles carry payloads away from the vehicle Geometric Center and avoid large travel of the location of the Center of Gravity. In addition, the system can adjust for variation of payload weight during flight to maintain control of the location of the vehicle's Center of Gravity.

The various embodiments allow the vehicles to carry many types of payloads in a lopsided position:

Graphical, touch and aural user interface for visual, face to face, and touch input communication Graphical visual display for advertising Dispensing of liquid horizontally Installing equipment onto walls, including sensors and markers Sensors requiring clear FOV Sensors requiring mechanical stabilization Robotic hand, grabber or crane Aerial vehicles armed with some of these payloads could see use in the following applications requiring interfacing with humans, dispensing payloads horizontally, as well as applying force or making contact against vertical surfaces. A few of the possible applications include:

Police and Security Use:

Virtual investigation of situation through conversation with persons on site

Situation de-escalation through body language and communications

Establishing visual communication channel between security forces and dispatch center/tactical command Help law enforcement enter rooms by opening doors or placing tactical charges Remote Real-Estate Viewing:
A real estate agent conducting face-to-face virtual property tour with his client, who is connected remotely.
Social Media and Self-Broadcasting:
Record footages using on board screen as tele-prompter/view finder direct controls.
Used to conduct interviews
Search and Rescue:
Use contact sensors to attempt to discover persons trapped in spaces
Place markers, beacons or tactical charges on walls
Inspection:
Use contact sensors to find fatigue cracks, especially on vertical surfaces such as wind turbines.
Warehouse Inventory Management
Scanning packages or detecting RFID tags
Pull stock from shelves
Water-borne vehicles armed with some of these payloads could see use in the following applications:
Cargo Loading:
Load or unload cargo without land based crane system
Load or unload smaller boats unto the deck Although the description above contains many specificities, these should not be construed as limiting the scope of the embodiments but as merely providing illustrations of some of several embodiments. Thus, the scope for the embodiments should be determined by the appended claims and their legal equivalents, rather than by the examples given.

Ww claim:

1. A mechanical gimbal system to be used on a vehicle, enabling the vehicle to carry a payload in a lopsided position, comprising four linkages contiguous to each other pivotally connected by four rotating joints, such that
   a. a first link is nominally positioned horizontally and parallel to a lateral axis of the vehicle, with sufficient length to connect the payload in a lopsided position in relation to the vehicle's vertical center line, the first link comprising;
      i. a payload attachment point at one end of the first link, designed to mechanically connect said payload in the lopsided position
      ii. a fulcrum joint located on said first link at approximately two-thirds length from the payload attachment point
      iii. a first pivot joint located at an end opposite of the said payload attachment point on the first link, configured to convert a force vector with at least one force component that is orthogonal to the first link causing a rotational torque about the fulcrum point
   b. a second link with a length that is approximately one-half that of the first link, the second link nominally oriented at substantially 30 degrees in relation to the first link's lateral axis, so that one end of the second link is pointing downwards, the second link comprising;
      i. a first rigid attachment point at the downward pointing end of the link, designed to mechanically connect to a piece of equipment
      ii. a second pivot joint located at the upward pointing end of the link, configured to enable the second link to rotate with a range from about 45 degrees above horizontal to about 90 degrees below horizontal
      iii. a third pivot joint located at the one-half span of the second link, designed to receive a force such that said force has reduced mechanical advantage in applying rotational energy on the said second link about the second pivot joint at the upward pointing end of the second link
   c. a third link, comprising;
      i. a second rigid attachment joint attached to the vehicle in an orientation such that the third link is parallel with the vehicle's vertical axis, and configured to transfer forces of the said gimbal system to the vehicle
      ii. a fourth pivot joint positioned near half of the span of the third link, configured to pivotally support the fulcrum joint of the first link
      iii. a fifth pivot joint, configured to support the second pivot joint at the upward pointing end of the second link
   d. wherein the piece of vehicle equipment being of sufficient mass and designed to attach to the second link at the first rigid attachment point, is configured to generate a rotational energy using gravitational force about the second pivot joint located at the upward pointing end of the second link
   e. a fourth link with pivot joints on both ends of the fourth link is configured to transfer the rotational energy from the second link to the first pivot joint thereby absorbing the rotational energy about the first link's fulcrum joint of the payload when the payload is in a lopsided position
   f. the pivot joints all constrain the four links to rotate with respect to each other in parallel planes
   g. a rotational motion of one the said links causes a movement in all other of the said links
   h. any continuous pair of the four links form an angle that is different from any other pair within the said gimbal system at any instant, thereby modulating the force transferred through the fourth link, returning the said first link's orientation back to the nominal horizontal orientation
   Whereby the said gimbal system enables a vehicle to attach a heavy payload in a lopsided position using substantially lighter equipment as counter balancing weight, and to absorb external perturbation to the payload in the lopsided position or to any part of the said gimbal system without additional measures of actuation.

2. A method of enabling a vehicle to carry a payload in a lopsided position with respect to the vehicle's center of gravity using a gimbal system, comprising the steps of;
   a. providing a mechanical fulcrum system, positioned horizontally and parallel to a lateral axis of the vehicle, the mechanical fulcrum system including a first link comprising,
      i. a payload attachment point at one end of the first link, designed to mechanically connect a payload in the lopsided position
      ii. a fulcrum joint located on said first link at approximately two-thirds length from the payload attachment point
      iii. a first pivot joint located at an end opposite of the said payload attachment point on the first link
   b. connecting a payload in a lopsided position to the one end of the mechanical fulcrum system, allowing the payload to generate rotational energy,
   c. providing a lever system, nominally oriented at substantially 30 degrees in relation to the mechanical fulcrum system's lateral axis, such that one end of the lever system is pointing downwards, the lever system including a lever arm comprising;

i. a first rigid attachment point at the downward pointing end of the lever arm,
ii. a second pivot joint located at the upward pointing end of lever arm, configured to enable system to rotate with a range from about 45 degrees above horizontal to about 90 degrees below horizontal
iii. a third pivot joint located at the one-half span of the arm,
d. connecting a weight to the lever system designed to receive an input force at a third pivot joint location on the lever arm such that the input force has reduced mechanical advantage working against the said weight,
e. connecting the third pivot joint located on the lever arm to the mechanical fulcrum system's first pivot joint using a mechanical link, such that the rotational energy of the fulcrum system generates the input force applied to the lever arm, resulting in static equilibrium about the fulcrum,
f. connecting the said fulcrum joint and the lever system, such that the fulcrum and the lever system's second pivot joints are fixed with respect to each other,
g. connecting the said fulcrum joint and the lever system, such that the fulcrum system and the lever system rotate in parallel planes,
h. designing the length of the said fulcrum and lever systems such that when the fulcrum is perturbed to rotate in a way that moves the payload lower with respect to the fulcrum joint, the lever system's mechanical advantage is reduced, increasing the lever system's input force, and thus increasing the fulcrum systems input force,
i. designing the length of the said fulcrum and lever systems such that when the fulcrum system's first link is perturbed to rotate in a way that moves the payload higher with respect to the fulcrum point, the lever system's mechanical advantage is increased, decreasing the lever system's input force, and thus decreasing the fulcrum systems input force
j. connecting the said fulcrum system and the lever system to the vehicle, Whereby said vehicle can carry a payload in a lopsided position using substantially lighter equipment as counter balancing weight, and can absorb external perturbation to the payload or any part of the said gimbal system without additional measures of actuation.

3. The method of claim 2, further including altering the said lever system's mechanical advantage such that a ratio between the distance of the said weight and the lever pivot point, versus the distance between the location of the said input force and the pivot point, is altered.

4. The mechanical gimbal system of claim 1, wherein the vehicle is a multi-rotor aerial vehicle.

5. The mechanical gimbal system of claim 1, wherein the vehicle is a water-borne vehicle.

6. The method of claim 2, wherein the vehicle is a multi-rotor aerial vehicle.

7. The method of claim 2, wherein the vehicle is a water-borne vehicle.

\* \* \* \* \*